Nov. 18, 1969     A. JAGERSBERGER     3,478,423
PRESSING AND COMPRESSING TUBULAR HEATERS
Filed July 28, 1965     2 Sheets-Sheet 1

Inventor
Adolf Jagersberger
By Stevens, Davis, Miller & Mosher
Attorneys

Nov. 18, 1969   A. JAGERSBERGER   3,478,423
PRESSING AND COMPRESSING TUBULAR HEATERS
Filed July 28, 1965   2 Sheets-Sheet 2

Inventor
Adolf Jagersberger
By Stevens, Davis, Miller & Mosher
Attorneys

United States Patent Office 3,478,423
Patented Nov. 18, 1969

3,478,423
PRESSING AND COMPRESSING TUBULAR
HEATERS
Adolf Jagersberger, Salzburg, Austria, assignor to Bleckmann & Co., Salzburg, Austria, a company of Austria
Filed July 28, 1965, Ser. No. 475,537
Claims priority, application Austria, July 31, 1964,
A 6,577/64
Int. Cl. H01c 17/00
U.S. Cl. 29—615    17 Claims

ABSTRACT OF THE DISCLOSURE

In a process for making tubular heaters the improvement comprising: inserting one or more heating elements and a filling material or insulating material in a metal tube; compressing the filling material or insulating tube; compressing the filling material or insulating material by reducing the diameter of the metal tube, thereby obtaining a precompressed tubular member; forming the precompressed tubular member into the shape desired for the tubular heater, thereby obtaining a prepressed tubular heater placing the prepressed tubular heater or several heaters so formed in a pressure reservoir; tightly closing the reservoir; feeding pressure media into the pressure reservoir; raising the pressure in the reservoir; turning off the pressure consequent upon the reaching of a given predetermined pressure; opening the reservoir and taking out the pressed tubular heaters.

---

Figure 1:
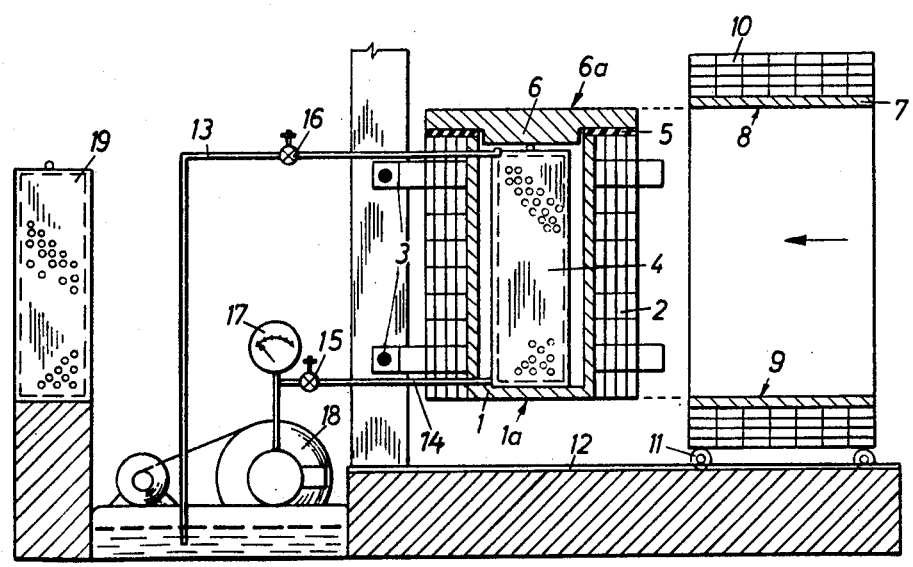

The invention relates to a process of producing tubular heaters of the type in which one or more heating elements are embedded in a filling material disposed in a tubular casing, and particularly to bent or curved tubular heaters of this type.

The factor which decides the durability of tubular electric heaters is the compression of the filling material inserted to insulate the element from the tubular casing, since the thermal conductivity of the filling material increases with the degree of compression. The more the filling material is compressed, the smaller becomes the temperature difference between the tubular casing and the element. Given the same heat loss—determined by the construction—from the tubular casing into the medium to be heated and given the same electrical power input, the temperature of the element will be lower the higher the degree of compression. Moreover, the temperature of the element is of decisive importance to the working life of the tubular heater.

It has therefore already been proposed that the bends or curves in tubular heaters should be recompressed mechanically in a pressure die after the bending operation; this technique counteracts loosening of the filling material caused by the bending operation.

Although recompressing the bends in this way does greatly lengthen the life of the heater it does entail considerable expenditure on tooling. Particularly in the case of heaters containing numerous bends expensive dies are required which can only be used in expensive high powered presses, since experience shows that for satisfactory recompression a pressure of about 10,000 kg. per square cm. is required. Moreover the dies are subject to heavy wear and frequently have to be exchanged and replaced by new ones.

With certain curved shapes, for example with helically coiled or otherwise three dimensionally curved heaters, recompression cannot be carried out at all, or can be carried out only at very great expense.

Finally, it may happen that in filling the heater with insulating material it is not possible to obtain a uniform filling density over the whole length of the tube. Although the lack of uniformity is partly compensated for when the cross-section of the tube is subsequently reduced by pressing, the degree of compression is often found to vary within a compressed tube. When a tubular heater is compressed in a pressure die made, for example, of tempered steel or the like, optimum compression is obtained very quickly in the parts that are already well compressed. This however prevents any further closing of the die, with the result that the poorly compressed parts of the heater remain insufficiently compressed.

It is an object of the present invention to provide a process for pressing and compressing tubular heaters enabling the compressing to be done more cheaply.

A further object of the invention is to provide a process for pressing and compressing tubular heaters enabling the filling and insulating material to be compressed more uniformly.

It is a further object of the invention to provide a process for pressing and compressing tubular heaters making it possible to compress heaters of complex shapes such as helically coiled or otherwise three dimensionally curved ones.

Another object of the present invention is to provide a process for pressing and decompressing tubular heaters whereby more marked and thus uncontrollable elongation of the tube during its compression can be avoided.

Another object of the invention is to provide for the more rational manufacture of heaters in cases where the element is surrounded by an *encasing tube*. The encasing tube contains openings for the water to be heated and is used particularly in connection with geysers. A spaced jacket is required for tubular cooking elements. Heaters with additional casings can be made by the process according to the invention.

In one method of carrying out the invention, one or more heating elements are placed in a metal tube together with filling and insulating material, and the diameter of the tube is reduced, thereby producing a certain precompression of the filling material. The tubular body thus precompressed is then deformed into the final shape of the heater. The preformed heater is placed, alone or preferably altogether with plurality of heaters, in a pressure reservoir which is tightly closed and pressurised by the insertion of pressure media. The isostatic pressure reduces the diameter of the tube still further and the final compression of the filling material is obtained.

Heaters are made with one or more heating elements, depending on what they are to be used for. The or each element is placed in a tube of previously sintered insulating material and the assembly is then inserted in the outer tube together with filling material in powder, grit or paste form. Strips of magnesium which are later oxidised may also be inserted. If the or each element has a given mechanical strength it is also possible for it to be placed in the tube together with the filling material without using a previously sintered tube of insulating material.

The process of the invention makes use chiefly of filling material in powder or grit form.

The first compressing operation is a preliminary one, that is to say, the diameter is reduced to such an extent that the precompression of the filling material is just sufficient to prevent the inserted element from being displaced during the further bending of the tube. No great elongation of the tube itself occurs during this slight compression.

Preliminary compression may be carried out mechanically in known manner by rolling, hammering or pressing. It is noteworthy that uncontrollable elongation or stretching of the tube is avoided as a result of the small degree of compression. In known compression methods where a far higher degree of compression is sought such stretching is inevitable.

After the preliminary compression the tubular heater is stress-free annealed, although the annealing process can be dispensed with depending on the material used and the state of deformation of the tube.

The precompressed tube is then deformed into the final shape of the finished heater. This involves subjecting the tube to bending and/or straightening operations and possibly providing it with additional covers. For some applications, for example for geysers, the covers or jackets are fitted onto the heater before it is deformed. Another type of tubular heater with a jacket is the tubular cooking element which can also be compressed by the process of the invention together with its outer cover.

Depending on the filling material and the pressure media used, caps, plugs or the like made of rubber or plastics which can later be removed are placed on the ends of the tube. These hold the filling material together and protect it from penetration by pressure fluid. It is also possible to use plugs made of dense insulating material and these can afterwards be left in the metal tube.

One or more tubes, possibly together with their jackets, are placed in a pressure reservoir and the reservoir is tightly closed. The pressure medium in the form of fluid such as water, oil or gases, is introduced into the reservoir. The pressure is raised by means of a pressure pump which repeatedly conveys pressure fluid into the reservoir or by means of a piston which is forced into the pressure fluid. If gas is used as the pressure fluid the pressure may be raised by explosion ignition. When the required level is reached the pressure is reduced. If the tube was precompressed a far lower pressure is exerted than would otherwise be required. Precompression requires a pressure, for example, of 100 kg. per square cm., whereas the final compression usually entails pressures of 3000 to 6000 kg. per square cm. The pressure level is selected according to the material used for the tube, the diameter and wall thickness of the tube and the degree of compression required for the filling material. Tests have shown that pressures of 3,000 to 6,000 kg. per square cm. produce a degree of compression which is reached only at about 10,000 to 15,000 kg. per square cm. where die presses are used. Given a diameter of about 8 mm. in the completely pressed tube and with a given degree of compression, it has been found that 6,000 kg. per square cm. were required both for steel tubes with a wall thickness of 1 mm. and for stainless steel tubes with a wall thickness of 0.5 mm. Obviously for certain applications requiring substantially less compression the final pressure can likewise be lower, for example as low as 2,000 kg. per square cm., whereas if particularly high compression is required and the walls of the tube are particularly thick pressure of over 6,000 kg. per square cm., for example up to 10,000 kg. per square cm., will be needed.

The process of the invention makes it possible to avoid using expensive pressing tools which wear out rapidly on account of the high pressure. As a plurality of tubes can be placed in the pressure reservoir at the same time production is also accelerated. The process of the invention is thus particularly suitable for use in mass production. It should be emphasised that, in spite of its suitability for mass production, the quality of the products obtained by this process is better than that of tubular heaters made in known manner.

In a known method the tube is elongated or stretched to an extent which cannot be exactly calculated beforehand and which leads to simultaneous stretching of the heating element contained in the tube. This stretching of the wire changes the resistance of the wire in an uncontrollable manner. As finished tubular heaters must be of a specific length at least some of the half finished tubular heaters have had to be cut to the required length. Earlier methods produced unevenly compressed heaters when the filling material was unevenly distributed along the tube during its insertion. As the process of the invention uses isostatic pressure, the reduction in the diameter of the tube will be greater in those places where the filling material has been inserted relatively loosely, so the final result is that the filling material is nevertheless uniformly compressed.

Tubular heaters of certain shapes can be compressed by a pressure die either not at all or only with difficulty once they have been shaped. One of the shapes in question is the helix. A helically coiled heater can readily be recompressed by the process of the invention. This is made possible by the fact that isostatic pressure is exerted from all directions.

If the tubular heater is only slightly curved or not curved at all, it is not necessary to precompress the filling material. In this case the precompression step is omitted and the filling material is brought straight to its final degree of compression by using an appropriate isostatic pressure.

Figure 2:
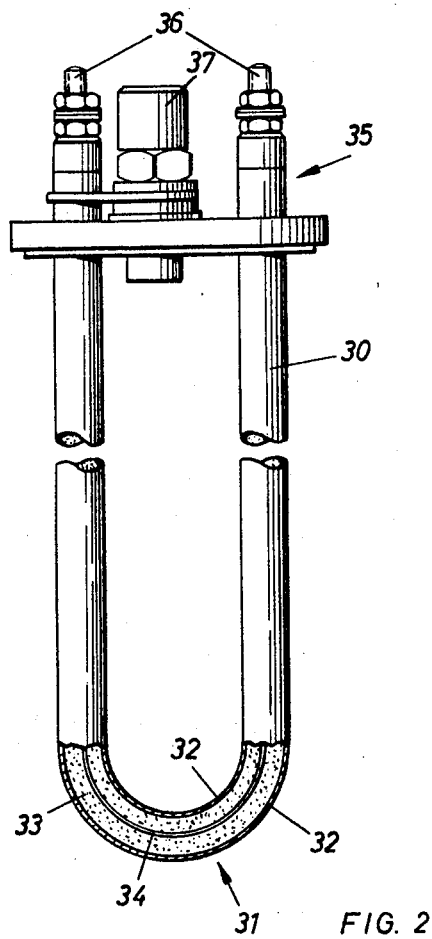

The invention will be further described, by way of example, with reference to the accompanying drawings, in which:

FIG. 1 diagrammatically shows one form of apparatus for reducing the diameter of the metal tube, and FIG. 2 shows a tubular heater as made by the process of the invention.

In the drawings, a cylindrical pressure reservoir 1 has a band iron trussing 2 which can take up high pressures in a radial direction. The reservoir 1 is attached to a wall by a suspension means 3. The reservoir 1 has an inner cavity adapted to receive a basket or cage insert 4 made of perforated sheet metal, and a cover 6, the top surface of which has level portions 6a suitable to form a bearing surface. The bottom surface of the reservoir 1 is also provided with level portions 1a suitable to form a bearing surface.

Tubular heaters are stacked in the cage insert 4. They can therefore be of various conformations, U shaped, coiled, curved, cylindrical rods, and so forth. If the inner cavity is to be used to the full the heaters must be packed as tightly as possible into the insert 4. The insert 4 is placed in the reservoir by removing the cover 6 from the latter and letting down the insert from above by means of a lifting implement (not shown). A high pressure seal 5 is then placed on the top edge of the reservoir 1 and the cover 6 is superimposed by means of the lifting implement (not illustrated).

A yoke 7, shaped like a box open at two opposite ends, has level surfaces 8 and 9 and a band iron trussing 10 to take up any pressure directed against these surfaces. The yoke 7 is provided with wheels 11 and stands on rails 12. It can therefore be pushed onto the reservoir 1 so that its surface 8 comes into contact with the surface 6a of the cover 6, and its surface 9 with the level surface 1a of the reservoir 1.

Pipes 13 and 14 are led through the trussing 2 and the walls of the reservoir 1 and can be opened and closed by taps 15 and 16. The pipe 14 leads to a contact or switching manometer 17 and a high pressure pump 18, and the pipe 13 to an oil tank.

When the taps 15 and 16 are opened oil is pumped into the pressure reservoir 1 by the high pressure pump 18 until the reservoir 1 is full and oil flows out through the pipe 13. Then the tap 16 is closed. The pump 18 now forces the oil into the reservoir 1 until a given pressure, which can be set at the contact manometer 17, is reached. On reaching the set pressure the manometer 17 responds and switches off the high pressure pump 18. The tap 16 is now opened again and the oil in the reservoir 1 can flow back via the pipe 14 and a tap (not shown) into the oil tank of the pump 18.

The pressure reservoir 1 is opened by moving the yoke 7 away to the right, in the opposite direction to that of the arrow, and raising the cover by means of the lifting implement (not shown), and the cage insert 4 containing the heaters is lifted out.

As a means of accelerating throughput additional cage inserts 19 are provided; these are filled with heaters during the operating cycle of the pressurising apparatus and are then ready for immediate insertion in the reservoir 1.

The apparatus illustrated in the drawing can be used both for preliminary compression in the region of 100 kg. per square cm. and for final compression in the region of 3000 to 6000 kg. per square cm.

FIG. 2 shows a heater 30 as made by the process of the invention. Unlike conventional ones this heater 30 has no visible recompression marks at the bends 31. These marks generally take the form of bulges on the outside of the heater. Another disadvantage of using mechanically recompression is that, when seen as a whole, the tube is of elliptical cross-section. In contrast with the known tubular heaters discussed the new heater 30 is of circular section throughout. This is also desirable from the point of view of heat transfer.

The heater comprises a metal tube 32, a filling and insulating material 33 and a heating element 34. The top 35 of the heater is shaped in known manner; it is provided in particular with connections 36 for the votlage supply, and with means 35 for fixing it in an aperture in a case.

I claim:

1. In a process for making tubular heaters the improvement comprising: inserting one or more heating elements and a filling material or insulating material in a metal tube; compressing the filling material or insulating material by reducing the diameter of the metal tube, thereby obtaining a precompressed tubular member; forming the precompressed tubular member into the shape desired for the tubular heater, thereby obtaining a prepressed tubular heater; placing the prepressed tubular heater or several heaters so formed in a pressure reservoir; tightly closing the reservoir; feeding pressure media into the pressure reservoir; exposing the entire periphery of the tubular heater or heaters to the pressure media in the reservoir prior to raising the pressure therein; raising the pressure in the reservoir; turning off the pressure consequent upon the reaching of a given predetermined pressure; opening the reservoir and taking out the pressed tubular heaters.

2. In a process for making tubular heaters, the improvement comprising: inserting one or more heating elements and a filling and insulating material in a metal tube; compressing the filling and insulating material by reducing the diameter of the metal tube, thereby producing a precompressed tubular member; stress-free annealing the metal tube; forming the precompressed tubular member into the shape of a tubular heater, thereby obtaining a prepressed tubular heater; placing the prepressed tubular heater or a plurality of heaters thus formed in a pressure reservoir; tightly closing the reservoir; feeding pressure media into the reservoir; exposing the entire periphery of the tubular heater or heaters to the pressure media in the reservoir prior to raising the pressure therein; raising the pressure in the reservoir; turning off the pressure consequent upon the reaching of a given predetermined pressure; opening the reservoir and taking out the pressed tubular heaters.

3. In a process for making tubular heaters, the improvement comprising: inserting one or more heating elements and filling and insulating material in a metal tube; compressing the filling and insulating material by reducing the diameter of the metal tube, thereby producing a precompressed tubular member; stress-free annealing the metal tube; pushing an enclosing jacket over the precompressed tubular member; deforming the precompressed tubular member thus formed into the shape desired for the heater; placing the prepressed tubular heater or a plurality of heaters thus formed in a pressure reservoir; tightly closing the reservoir; feeding pressure media into the reservoir; exposing the entire periphery of the tubular heater or heaters to the pressure media in the reservoir prior to raising the pressure therein; raising the pressure in the reservoir; turning off the pressure consequent upon the reaching of a given predetermined pressure; opening the reservoir and taking out the pressed tubular heaters.

4. In a process of making a tubular heater, the improvement comprising: inserting one or more heating elements and a filling and insulating material in a metal tube; precompressing the filling and insulating material by reducing the diameter of the metal tube, thereby producing a precompressed tubular member; stress-free annealing the precompressed tubular member; forming the tubular heater into the desired shape, thereby obtaining a prepressed tubular heater; placing caps, plugs, or the like on the open ends of the prepressed heater; placing the prepressed heater or a plurality of heaters thus formed in a pressure reservoir; tightly closing the reservoir; feeding pressure media into the reservoir; exposing the entire periphery of the heater or heaters to the pressure media in the reservoir prior to raising the pressure therein; raising the pressure in the reservoir; turning off the pressure consequent upon the reaching of a given predetermined pressure; opening the reservoir and taking out the pressed tubular heaters.

5. In a process of making a tubular heater, the improvement comprising: inserting one or more heating elements and a filling and insulating material in a metal tube; precompressing the filling and insulating material by reducing the diameter of the metal tube, thereby producing a precompressed tubular member; stress-free annealing the metal tube; pushing a jacket onto the precompressed tubular member; forming the precompressed tubular member together with the jacket into the shape desired for the heater, thereby obtaining a preshaped tubular heater, placing caps, plugs and the like on the open ends of the metal tube; placing the preshaped heater or heaters enclosed in a jacket in a pressure reservoir; tightly closing the reservoir; feeding pressure media into the reservoir and simultaneously letting out air; exposing the entire periphery of the heater or heaters to the pressure media in the reservoir prior to raising the pressure therein; raising the pressure in the reservoir by admitting a further supply of pressure media; turning off the pressure consequent upon the reaching of a given predetermined pressure within the range from 1,000 to 10,000 kg. per sq. cm.; opening the reservoir and taking out the pressed heater or heaters.

6. In a process of making a tubular heater, the improvement comprising: inserting one or more heating elements and a filling and insulating material in a metal tube; precompressing the filling and insulating material by mechanically rolling, hammering or pressing the metal tubular jacket to a smaller diameter, thereby exerting on the filling and insulating material a pressure which produces a degree of compression in said material such that on subsequent bending of the metal tube the inserted heating element or elements are not displaced, the pressure however, being small enough substantially to prevent any elongation of the metal tube when the diameter is reduced; stress-free annealing the precompressed tubular member; forming the precompressed tubular member into the shape of the finished tubular heater, thereby obtaining a prepressed tubular heater; placing caps, plugs and the like on the open ends of the metal tube; placing the preshaped tubular heater or heaters enclosed in a jacket in a pressure reservoir; tightly sealing the reservoir; feeding pressure media into the reservoir and simultaneously letting out air; exposing the entire periphery of the tubular heater or heaters to the pressure media in the reservoir prior to raising the pressure therein; raising the pressure in the reservoir by admitting a further supply of pressure media; turning off the pressure consequent upon the reaching of a given predetermined pressure within the range from 1,000 to 10,000 kg. per sq. cm.; opening the pressure reservoir and taking out the pressed tubular heater or heaters.

7. In a process of making a tubular heater, the improvement comprising: inserting one or more heating elements and a filling and insulating material in a metal tube; precompressing the filling and insulating material in the tube by mechanically rolling, hammering or pressing the tube to a smaller diameter so that the degree of compression of the filling material is sufficient to prevent the heating element from being displaced during an operation of bending the tube, the reduction in diameter however being small enough to prevent any substantial stretching of the tube; stress-free annealing the precompressed tubular member; placing a jacket over the precompressed tubular member; forming the precompressed tubular member together with the jacket into the shape of the finished heater, thereby obtaining a prepressed heater; placing caps, plugs and the like on the open ends of the metal tube; placing the preshaped tubular heater or heaters enclosed in a jacket in a pressure reservoir; tightly sealing the reservoir; feeding pressure media into the reservoir and simultaneously letting out air; exposing the entire periphery of the tubular heater or heaters to the pressure media in the reservoir prior to raising the pressure therein; raising the pressure in the reservoir by admitting a further supply of pressure media; turning off the pressure consequent upon the reaching of a given predetermined pressure within the range from 1,000 to 10,000 kg. per sq. cm.; opening the reservoir and taking out the pressed tubular heater or heaters.

8. In a process of making a tubular heater, the improvement comprising: inserting one or more heating elements and a filling and insulating material in a metal tube, thereby obtaining a tubular member; placing one or more tubular members in a pressure reservoir; tightly sealing the reservoir; feeding pressure media into the reservoir; raising the pressure in the reservoir; turning off the pressure in the reservoir consequent upon the reaching of a given predetermined low pressure level producing a reduction in the diameter of the metal tube and a precompression of the filling material such that the inserted heating element is substantially not displaced on later deformation of the tubular member but such that the reduction in diameter is small enough substantially to avoid any elongation or stretching of the tubular member, in particular a pressure of from 50 to 1,000 kg. per sq. cm.; opening the pressure reservoir and taking out the prepressed tubular member or members; forming the tubular members into the shape of the finished heater; placing the preshaped heater in a pressure reservoir; tightly sealing the reservoir; feeding pressure media into the reservoir; exposing the entire periphery of the heater to the pressure media in the reservoir prior to raising the pressure therein; raising the pressure in the reservoir; turning off the pressure consequent upon the reaching of a given predetermined pressure dependent upon the materials making up the tube, and on the filling material and its dimensions and selected with a view to the desired degree of compression, in particular a pressure of from 1,000 to 10,000 kg. per sq. cm.; opening the pressure reservoir and taking out the pressed tubular heater.

9. In a process of making a tubular heater, the improvement comprising: inserting one or more heating elements and filling and insulating material in powder and/or grit form in a metal tube to obtain a tubular member; placing caps or the like on the open ends of the tube; placing the tubular member or members in a pressure reservoir; tightly sealing the reservoir; feeding pressure media into the reservoir; raising the pressure; turning off the pressure consequent upon the reaching of a given predetermined pressure producing a reduction in the diameter of the metal tube or tubes, whereby the filling material is compressed to a degree such that the heating element or elements are prevented from moving during any later operation of bending the tubular member, but not large enough to cause any substantial stretching or elongation of the tubular member during the reduction of its diameter, in particular a pressure of from 50 to 1,000 kg. per sq. cm.; opening the reservoir and taking out the prepressed tubular member or members; forming the tubular member or members into the shape of the finished heater or heaters; placing the tubular heater or a plurality of such heaters in a pressure reservoir; tightly sealing the reservoir; feeding pressure media into the reservoir; exposing the entire periphery of the tubular heater or heaters to the pressure media in the reservoir prior to raising the pressure therein; raising the pressure in the reservoir; turning off the pressure consequent upon the reaching of a given predetermined pressure, which pressure depends on the diameter, wall thickness and material of the tube, on the filling material and on the desired degree of compression and is of the order of from 2,000 to 10,000 kg. per sq. cm.

10. In a process of making a tubular heater, the improvement comprising: inserting one or more heating elements and a filling an dinsulating material in powder and/or grit form in a metal tube to obtain a tubular member; placing caps, plugs or the like on the open ends of the metal tube; placing the tubular member or a plurality of tubular members in a pressure reservoir; tightly sealing the reservoir; feeding pressure media into the reservoir; raising the pressure in the reservoir; turning off the pressure in the reservoir consequent upon the reaching of a given predetermined pressure producing a slight reduction in diameter and accordingly a slight compression of the filling material, so that the inserted heating element is not displaced in any bending operation, in particular a pressure of from 50 to 1,000 kg. per sq. cm.; opening the reservoir and taking out the prepressed tubular member; pushing a jacket onto the tubular member; forming the tubular member together with the jacket into the shape desired for the heater; placing the prepressed heater or a plurality of such heaters in a pressure reservoir; tightly sealing the reservoir; feeding pressure media into the reservoir; exposing the entire periphery of the heater or heaters to the pressure media in the reservoir prior to raising the pressure therein; raising the pressure in the reservoir; turning off the pressure in the reservoir consequent upon the reaching of a given predetermined pressure determined by the material and size of the tube and with a view to the degree of compression desired for the filling material, in particular a pressure of from 2,000 to 10,000 kg. per sq. cm.; opening the reservoir and taking out the pressed heater.

11. In a process of making a tubular heater, the improvement comprising: inserting one or more heating elements and a filling and insulating material in the powder and/or grit form in a tube to obtain a tubular member; placing caps or the like on the open ends of the tube; placing the tubular member or a plurality of tubular members in a pressure reservoir; tightly sealing the reservoir; feeding pressure media into the reservoir; raising the pressure; turning off the pressure consequent upon the reaching of a given pressure, sufficient for preliminary compression, of about 50 to 1,000 kg. per sq. cm.; opening the reservoir and taking out the prepressed tubular member or members; removing the attached caps, plugs or the like; stress-free annealing the precompressed tubular member or members; forming the tubular member or members into the final shape of the heater; placing caps, plugs or the like on the open ends of the prepressed tubular heater; placing the prepressed tabular heater or a plurality of such heaters in a pressure reservoir; tightly sealing the reservoir; feeding pressure media into the reservoir; exposing the entire periphery of the tubular heater or heaters to the pressure media in the reservoir prior to raising the pressure therein; raising the pressure in the reservoir; turning off the pressure in the reservoir consequent upon the reaching of a given predetermined pressure of about 3,000 to 6,000 kg. per sq. cm. depending on the desired degree of compression, the material and the geometric structure of the metal tube; opening the reservoir and taking out the pressed heater or heaters.

12. In a process of making a tubular heater, the improvement comprising: inserting one or more heating elements and a filling and insulation material in powder and/or grit form in a tube to obtain a tubular member; placing caps or the like on the open ends of the tube; placing the tubular member or a plurality of tubular members in a pressure reservoir; tightly sealing the reservoir; feeding pressure media into the reservoir; raising the pressure; turning off the pressure consequent upon the reaching of a given pressure, sufficient for preliminary compression, of about 50 to 1,000 kg. per sq. cm.; opening the reservoir and taking out the prepressed tubular member or members; removing the attached caps, plugs or the like; stress-free annealing the precompressed tubular member or members; fitting a jacket around the prepressed tubular heater; placing the prepressed tubular heater or several heaters so formed in a pressure reservoir; tightly closing the reservoir; feeding pressure media into the pressure reservoir; exposing the entire periphery of the tubular heater or heaters to the pressure media in the reservoir prior to raising the pressure therein; raising the pressure in the reservoir; turning off the pressure consequent upon the reaching of a given predetermined pressure; opening the reservoir and taking out the pressed tubular heaters.

13. In a process of making a tubular heater, the im provement comprising: inserting one or more heating elements and filling and insulating material in powder and/or grit form in a metal tube to obtain a tubular member; inserting a filling piece in plug form at the open ends of the metal tube; placing the tubular member or members in a pressure reservoir; tightly sealing the reservoir; feeding compressed gas into the pressure reservoir; raising the pressure in the reservoir; turning off the pressure when a pressure of from about 50 to 1,000 kg. per sq. cm. is reached; opening the reservoir and taking out the prepressed tubular member or members; forming the member or members into the final shape of the tubular heater; placing the prepressed tubular member or members in a pressure reservoir; tightly sealing the reservoir; feeding an explosive mixture into the reservoir; exposing the entire periphery of the tubular heater or heaters to the explosive mixture in the reservoir prior to ignition of the explosive mixture; igniting the explosive mixture; letting off the excess pressure; opening the reservoir and taking out the pressed tubular heaters.

14. In a process of making tubular heaters, the improvement comprising: inserting one or more heating elements and filling and insulating material in powder and/or grit form in a metal tube to obtain a tubular member; placing detachable caps, plugs or the like made of rubber or plastics on the open ends of the tube; placing a plurality of tubular members in a cage or basket and putting the latter in a pressure reservoir; tightly sealing the reservoir by placing a seal and a cover on the mouth of the reservoir and pushing a yoke over the whole unit; feeding oil into the reservoir and simultaneously letting out air; closing the vent of the reservoir; raising the pressure in the reservoir by admitting more oil by means of a high pressure pump; turning off the pressure when about 100 kg. per sq. cm. is reached; opening the reservoir by removing the yoke and lifting off the cover, and taking out the pressed tubular members; removing the caps, plugs and the like from the ends of the tubular members; stress-free annealing the precompressed tubular members; forming the tubular members into the final shape of the heaters; placing caps, plugs or the like made of rubber or plastics on the open ends of the preshaped tubular heaters; placing a plurality of preshaped tubular heaters in a cage and the cage in a pressure reservoir; tightly sealing the reservoir by placing a seal and a cover over the mouth of the reservoir and pushing a yoke over the whole unit; feeding oil into the reservoir and simultaneously letting out air; closing the vent of the reservoir; exposing the entire periphery of the tubular heaters to the oil in the reservoir prior to raising the pressure therein; raising the pressure in the reservoir by feeding in more oil by means of a high pressure pump; turning off the pressure when a pressure of about 3,000 to 6,000 kg. per sq. cm. is reached; venting the pressure reservoir and letting out the oil; opening the reservoir and taking out the cage and with it the pressed tubular heaters.

15. In a process of making a tubular heater, the improvement comprising: inserting one or more heating elements and a filling and insulating material in powder and/or grit form in a metal tube to obtain a tubular member; placing detachable caps, plugs or the like made of rubber or plastics on the open ends of the metal tube; placing a plurality of tubular members in a pressure reservoir; tightly sealing the reservoir; letting water into the reservoir; raising the pressure in the reservoir; turning off the pressure when a pressure of about 100 kg. per sq. cm. is reached; opening the reservoir and taking out the prepressed tubular members; removing the caps, plugs or the like from the ends of the tubular members; stress-free annealing the precompressed tubular members; forming the precompressed tubular member into the shape of the finished heater; placing caps, plugs or like made of rubber or plastics on the open ends of the preshaped tubular heater; placing the prepressed heater or heaters in a pressure reservoir; tightly sealing the reservoir; letting water into the reservoir; exposing the entire periphery of the heater or heaters to the water in the reservoir prior to raising the pressure therein; raising the pressure in the reservoir by admitting more water; turning off the pressure when a predetermined level of about 3,000 to 6,000 kg. per sq. cm. is reached; opening the reservoir and taking out the pressed tubular heater.

16. In a process of making a tubular heater, the improvement comprising: inserting one or more heating elements and a filling and insulating material in a tube to obtain a tubular member; forming the tubular member into the shape of the finished heater; placing the preshaped heater or heaters in a pressure reservoir; tightly sealing the reservoir; feeding pressure media into the reservoir; exposing the entire periphery of the heater or heaters to the pressure media in the reservoir prior to raising the pressure therein; raising the pressure in the reservoir; turning off the pressure in the reservoir when a pressure of about 3,000 to 6,000 kg. per sq. cm. is reached; opening the reservoir and taking out the completely pressed tubular heater or heaters.

17. In a process of making a tubular heater, the improvement comprising: inserting one or more heating elements and a filling and insulating material in a tube to obtain a tubular member; placing caps, plugs or the like made of rubber on the open ends of the tube; placing a plurality of tubular members in a cage and the cage in a pressure reservoir; tightly sealing the reservoir by placing a seal and a cover over the mouth of the reservoir and pushing a yoke over the whole unit; letting oil into the pressure reservoir and simultaneously letting out air; closing the vent of the reservoir; exposing the entire periphery of the tubular members to the oil in the reservoir prior to raising the pressure therein; raising the pressure in the reservoir by supplying more oil by means of a high pressure pump; turning off the pressure when a given predetermined level in the region of from 3,000 to 6,000 kg. per sq. cm. is reached; venting the pressure reservoir and letting out the oil; opening the reservoir and taking out the cage and with it the pressed tubular heaters.

References Cited

UNITED STATES PATENTS

| | | |
|---|---|---|
| 1,081,618 | 12/1913 | Madden. |
| 2,428,900 | 10/1947 | Wiegand _____ 338—228 X |
| 2,483,839 | 10/1949 | Oakley et al. _____ 338—238 X |
| 2,677,172 | 5/1954 | Oakley _____ 29—155.65 X |
| 2,878,140 | 3/1959 | Barr. |
| 3,156,974 | 11/1964 | Bobrowsky _____ 29—421 X |
| 3,192,621 | 7/1965 | Bauer et al. _____ 29—421 X |

FOREIGN PATENTS 22,929   6/1935   Australia.

JOHN F. CAMPBELL, Primary Examiner

J. L. CLINE, Assistant Examiner

PO-1050
(5/69)

UNITED STATES PATENT OFFICE
CERTIFICATE OF CORRECTION

Patent No. 3,478,423      Dated November 18, 1969

Inventor(s) Adolf Jagersberger

It is certified that error appears in the above-identified patent and that said Letters Patent are hereby corrected as shown below:

Column 1, line 22, after "heater" insert -- ; --;
Column 3, line 47, change "3000" to -- 3,000 --; line 47, change "6000" to -- 6,000 --;
Column 5, line 36, delete "35" and insert -- 37 --;
Column 6, line 1, before "filling" insert -- a --; line 46, delete "tubular heater," and insert -- tubular heater; --;
Column 9, line 40, before "filling" insert -- a --; line 61, before "filling" insert -- a --;
Column 10, line 35, before "like" insert -- the --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents